United States Patent
Matsen et al.

(10) Patent No.: US 10,000,026 B2
(45) Date of Patent: Jun. 19, 2018

(54) COMPOSITE INDUCTION CONSOLIDATION APPARATUS AND METHOD

(75) Inventors: Marc R. Matsen, Seattle, WA (US); Mark A Negley, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 1413 days.

(21) Appl. No.: 13/082,532

(22) Filed: Apr. 8, 2011

(65) Prior Publication Data

US 2012/0255947 A1    Oct. 11, 2012

(51) Int. Cl.
| H05B 6/64 | (2006.01) |
| B29C 70/46 | (2006.01) |
| B29C 35/02 | (2006.01) |
| B29C 35/08 | (2006.01) |
| B29C 33/06 | (2006.01) |
| B29K 101/12 | (2006.01) |

(52) U.S. Cl.
CPC .............. *B29C 70/46* (2013.01); *B29C 33/06* (2013.01); *B29C 35/0227* (2013.01); *B29C 35/0805* (2013.01); *B29C 2035/0811* (2013.01); *B29K 2101/12* (2013.01)

(58) Field of Classification Search
CPC .............. H05B 6/06; H05B 6/36; H05B 6/10
USPC ....... 219/757, 759, 602, 603, 615, 616, 617, 219/632–635, 646, 649, 657, 659
See application file for complete search history.

(56) References Cited

U.S. PATENT DOCUMENTS

| 5,412,185 | A | 5/1995 | Sturman, Jr. et al. |
| 5,645,744 | A | 7/1997 | Matsen et al. |
| 5,728,309 | A | 3/1998 | Matsen et al. |
| 6,211,497 | B1 | 4/2001 | Matsen et al. |
| 6,528,771 | B1 * | 3/2003 | Matsen et al. ............... 219/634 |
| 6,906,300 | B2 | 6/2005 | Brown et al. |
| 6,979,807 | B2 * | 12/2005 | Anderson et al. ............ 219/757 |
| 8,017,059 | B2 | 9/2011 | Matsen et al. |
| 2002/0168466 | A1 * | 11/2002 | Tapphorn et al. ............ 427/180 |
| 2005/0035115 | A1 | 2/2005 | Anderson et al. |
| 2009/0071217 | A1 * | 3/2009 | Matsen et al. ............... 72/342.3 |
| 2009/0074905 | A1 | 3/2009 | Matsen et al. |

FOREIGN PATENT DOCUMENTS

| JP | H0596548 A | 4/1993 |
| JP | 2008506562 A | 3/2008 |
| JP | 2009292002 A | 12/2009 |
| WO | 9639291 A1 | 12/1996 |

OTHER PUBLICATIONS

European Search Report, dated Aug. 1, 2012, regarding Application No. EP12159954, 7 pages.

(Continued)

*Primary Examiner* — Phuong Nguyen
(74) *Attorney, Agent, or Firm* — Yee & Associates, P.C.

(57) ABSTRACT

A composite induction consolidation apparatus includes a base mandrel and a ferromagnetic base mandrel facesheet having a specific Curie temperature carried by the base mandrel. The base mandrel facesheet is adapted to support a composite part and allow ambient air pressure to compact the composite part against the base mandrel facesheet. At least one magnetic induction coil is provided in the base mandrel.

18 Claims, 5 Drawing Sheets

(56) References Cited

OTHER PUBLICATIONS

European Patent Office Communication, dated May 6, 2015, regarding Application No. EP12159954.2, 4 pages.
European Patent Office Communication, dated Feb. 4, 2016, regarding Application No. EP12159954.2, 3 pages.
Notice of Reasons for Rejection and English Translation, dated Oct. 20, 2015, regarding Japanese Patent Application No. 2012-085596, 5 pages.
Canadian Intellectual Property Office Examination Report, dated Oct. 14, 2016, regarding Application No. 2,770,925, 3 pages.

* cited by examiner

COMPOSITE INDUCTION CONSOLIDATION APPARATUS AND METHOD

This invention was made with Government support under contract number DE-FG36-08GO18135 awarded by the United States Department of Energy. The government has certain rights in this invention.

TECHNICAL FIELD

The disclosure is generally directed to composite fabrication apparatus and methods. More particularly, the disclosure relates to a composite induction consolidation apparatus and method which includes induction consolidation of thermoplastic composites while utilizing an autoclave for consolidation pressure application.

BACKGROUND

Processing techniques and facilities which enable widespread use of molded thermoplastic composite components at production rates and production costs and that allow significant weight savings scenarios may be desirable in some applications. The capability to rapidly heat, consolidate and cool in a controlled manner may be required for high production rates of composite components. However, current resistive (radiant and convective) heating used in today's autoclave designs render processing of high-performance thermoplastic composite structures problematic due to extended cycles and wear and tear on equipment due to higher processing temperatures.

Therefore, a composite induction consolidation apparatus and method which includes induction consolidation of thermoplastic composites while utilizing an autoclave for consolidation pressure application is needed.

SUMMARY

The disclosure is generally directed to a composite induction consolidation apparatus. An illustrative embodiment of the apparatus includes a base mandrel and a ferromagnetic base mandrel facesheet having a specific Curie temperature carried by the base mandrel. The base mandrel facesheet is adapted to support a composite part and allow ambient air pressure to compact the composite part against the base mandrel facesheet. At least one magnetic induction coil is provided in the base mandrel.

In some embodiments, the composite induction consolidation apparatus may include a base mandrel; a ferromagnetic base mandrel facesheet having a specific Curie temperature carried by the base mandrel, the base mandrel facesheet adapted to support a composite part and allow ambient air pressure to compact the composite part against the base mandrel facesheet; at least one magnetic induction coil in the base mandrel; at least one cooling channel extending through the base mandrel; an enclosing hood carried by the base mandrel; a ferromagnetic enclosing hood facesheet having a specific Curie temperature carried by the enclosing hood and adapted for positioning into adjacent proximity to the composite part; at least one magnetic induction coil in the enclosing hood; and at least one cooling channel extending through the enclosing hood.

The disclosure is further generally directed to composite induction consolidation method. An illustrative embodiment of the method includes providing a base mandrel having a ferromagnetic base mandrel facesheet; placing a thermoplastic composite part on the base mandrel facesheet; heating the base mandrel facesheet and the thermoplastic composite part; consolidating the thermoplastic composite part using ambient air pressure; and cooling the thermoplastic composite part.

BRIEF DESCRIPTION OF THE ILLUSTRATIONS

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
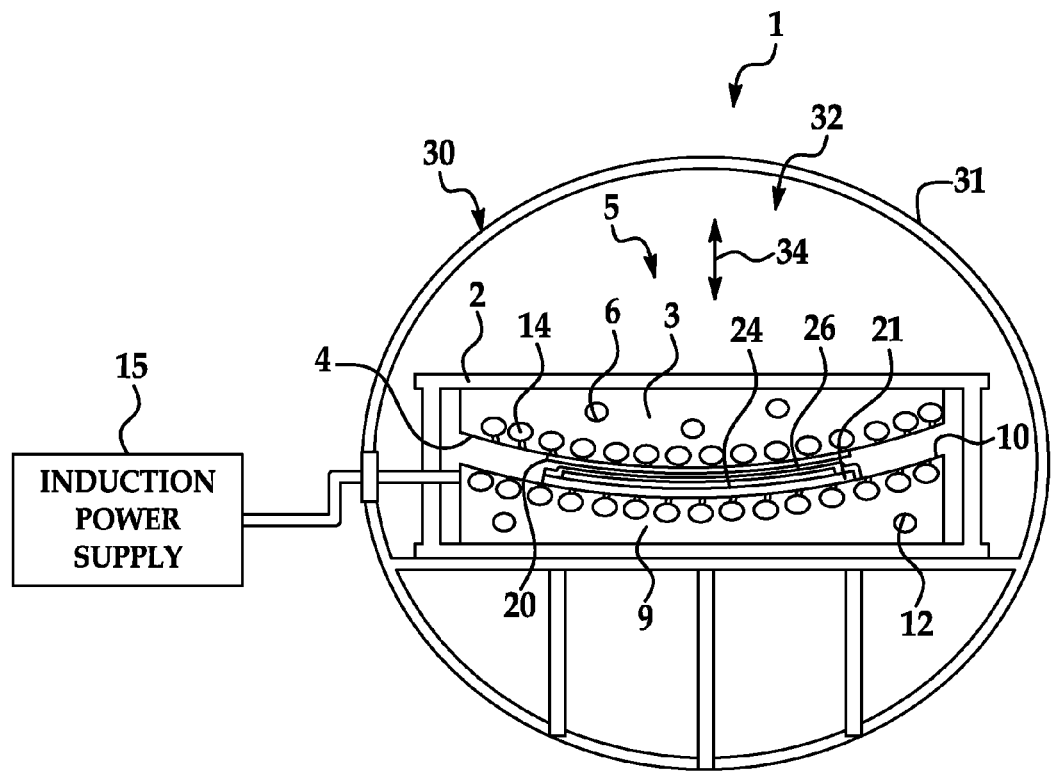
FIG. 1 is a block diagram of an illustrative embodiment of the composite induction consolidation apparatus.
Figure 2:
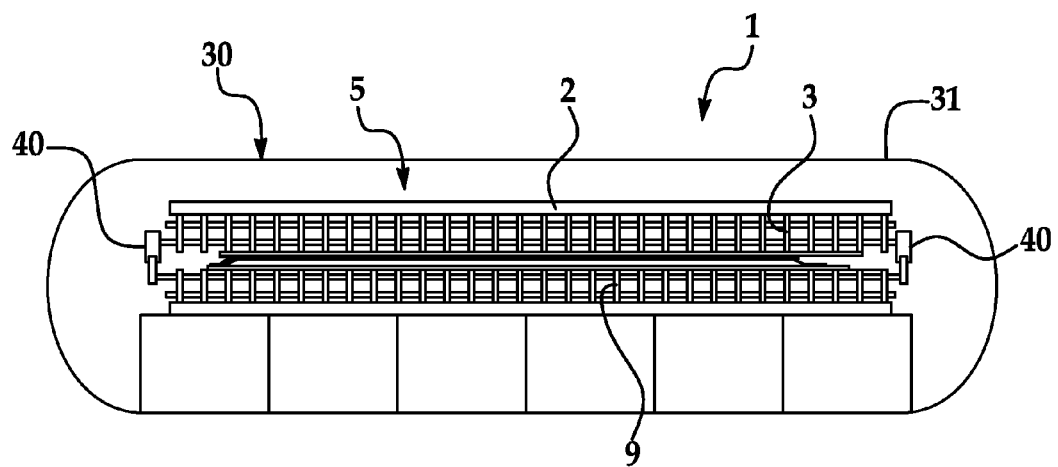
FIG. 2 is a side view of an illustrative embodiment of the composite induction consolidation apparatus.
Figure 3:
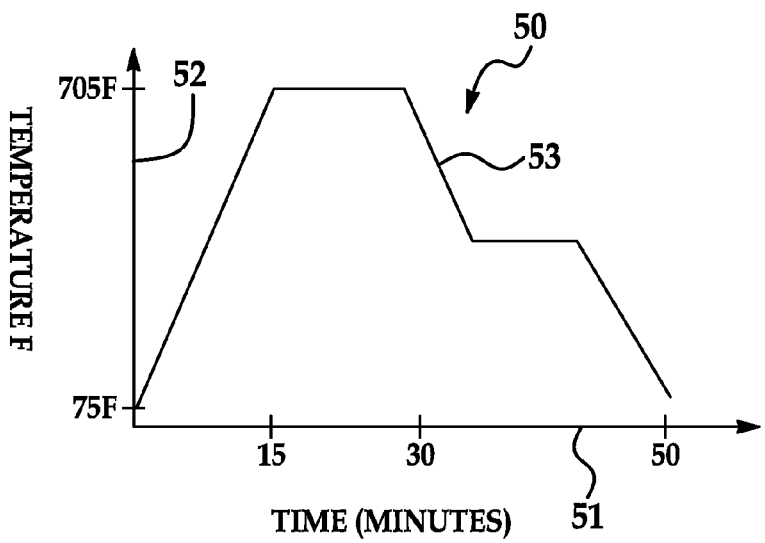
FIG. 3 is an exemplary time vs. temperature curve which characterizes operation of the composite induction consolidation apparatus.

Referring initially to FIGS. 1-3, an illustrative embodiment of the composite induction consolidation apparatus, hereinafter apparatus, is generally indicated by reference numeral 1. The apparatus 1 may include an autoclave 30. The autoclave 30 may have a conventional design with an autoclave housing 31 having an autoclave interior 32. The autoclave 30 may have an operating pressure 34 of at least about 200 psi.

An induction heated tool 5 may be provided in the autoclave 30. The induction heated tool 5 may include a tool frame 2. In some embodiments, the tool frame 2 may be fiberglass. A base mandrel 9 may be provided on the tool frame 2. An enclosing hood 3 may be pivotally attached to the base mandrel 9 via at least one hinge 8. The enclosing hood 3 may be hydraulically-actuated to facilitate pivoting of the enclosing hood 3 with respect to the base mandrel 9. The base mandrel 9 may have a contoured mandrel surface 10, whereas the enclosing hood 3 may have a contoured hood surface 4 which is complementary to the contoured mandrel surface 10 of the base mandrel 9. In some embodiments, each of the base mandrel 9 and the enclosing hood 3 may be a laminated tooling die including 0.185" thick 300-Series lamination. As shown in FIG. 2, in some embodiments, mechanical pin connectors 40 may be used to connect the enclosing hood 3 to the base mandrel 9.

Multiple induction coils 14 may extend through each of the base mandrel 9 and the enclosing hood 3 to facilitate selective heating of each. The induction coils 14 may be solenoidal water-cooled induction coils which envelope the contoured mandrel surface 10 and the contoured hood surface 4. An induction power supply 15 may be electrically connected to the induction coils 14. In some embodiments, the induction power supply 15 may be a 2,000 KW induction power supply having an operating frequency of 1-3 KHz. A base mandrel facesheet 21 may be thermally coupled to the induction coils 14 of the base mandrel 9. An enclosing hood facesheet 20 may be thermally coupled to the induction coils 14 of the enclosing hood 3. Each of the base mandrel facesheet 21 and the enclosing hood facesheet 20 may be a thermally-conductive material such as, but not limited to, a ferromagnetic material, cobalt, nickel, or compounds thereof. In some embodiments, the base mandrel facesheet 21 and the enclosing hood facesheet 20 may be an INVAR® (64FeNi) smart susceptor. The base mandrel facesheet 21 may generally conform to the contoured mandrel surface 10 and the enclosing hood facesheet 20 may generally conform to the contoured hood surface 4.

In some embodiments, cooling channels 6 may extend through each of the enclosing hood 3 and the base mandrel 9. A cooling system (not shown) may be disposed in fluid communication with the cooling channels 6. The cooling system may be adapted to distribute a coolant (not shown) through the cooling channels 6 in operation of the apparatus 1, which will be hereinafter described.

In exemplary application of the apparatus 1, a thermoplastic composite part or layup 24 is placed in bagging 26 and evacuated onto the base mandrel facesheet 21 on the base mandrel 9. The enclosing hood facesheet 20 is disposed above and out of contact with the bagging 26 which encloses the thermoplastic composite part 24. The induction power supply 15 is then operated to power the induction coils 14 in the enclosing hood 3 and in the base mandrel 9. The induction coils heat the enclosing hood facesheet 20 and the base mandrel facesheet 21 to the Curie temperature point. The resulting change from magnetic to non-magnetic state of the enclosing hood facesheet 20 forces a leveling of the temperature of the enclosing hood facesheet 20 and the thermoplastic composite part 24 (~2 KHz frequency of operation and ~0.125" susceptor thickness). In some applications, heating of the enclosing hood facesheet 20 and the base mandrel facesheet 21 to the Curie temperature point may occur in 15 minutes or less. Since only the mass of the enclosing hood facesheet 20 and the base mandrel facesheet 21 may be heated and large quantities of power can be directly coupled into the enclosing hood facesheet 20 and the base mandrel facesheet 21 from the induction power supply 15, rapid heating of the thermoplastic composite part 24 can be achieved.

After the thermoplastic composite part 24 is heated, pressure 34 is applied to the thermoplastic composite part 24 by pressurization operation of the autoclave 30. In some applications, the pressure 34 which is applied to the thermoplastic composite part 24 may be at least about 200 psi. This step consolidates the thermoplastic composite part 24. In some applications, consolidation of the thermoplastic composite part 24 may occur in 15 minutes or less. After consolidation of the thermoplastic composite part 24 is completed, forced gas cooling of the thermoplastic composite part 24 may be accomplished by cooling operation of the autoclave 30. This step rapidly and evenly cools the thermoplastic composite part and may be accomplished in as quick as 20 minutes or less depending on the degree of crystallinity desired and the resin used for the thermoplastic composite part 24. After consolidation, the thermoplastic composite part 24 may be removed from the induction heated tool 5.

It will be appreciated by those skilled in the art that high-performance thermoplastic composite components can be consolidated in the autoclave 30 in a ~50 minute cycle or less. The apparatus 1 may enable the use of higher-performing composite materials and help eliminate current production bottlenecks in the production system. Furthermore, the technology may enable further leveraging of existing equipment by increasing product throughput without significant additional capital investments.

As shown in FIG. 3, an exemplary time vs. temperature graph 50 which characterizes operation of the composite induction consolidation apparatus is shown. The graph 50 includes a time axis 51 (X-axis), a temperature axis 52 (Y-axis) and a time vs. temperature curve 53. In exemplary application of the apparatus 1, the enclosing hood facesheet 20 of the enclosing hood 3 is heated from a baseline level (such as about 75 degrees F.) to the Curie temperature point (about 705 degrees F.) in about 15 minutes. The temperature of the enclosing hood facesheet 20 levels off and then gradually returns to the baseline level. Consolidation of the thermoplastic composite part 24 is then carried out.

Figure 1A:
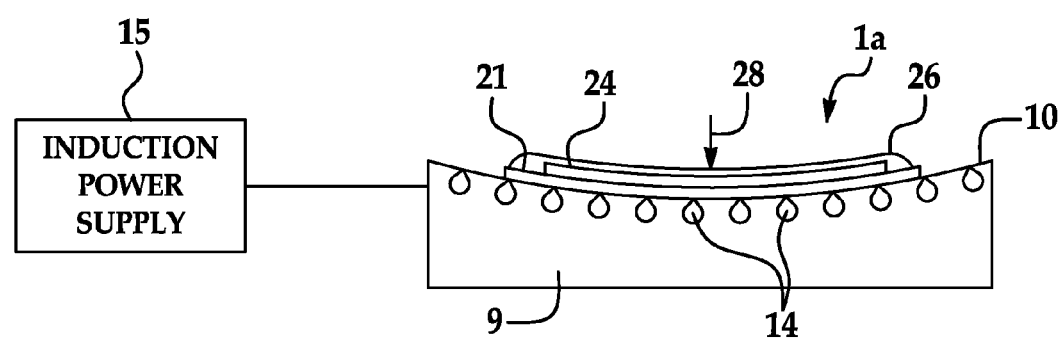
FIG. 1A is a block diagram of an alternative illustrative embodiment of the composite induction consolidation apparatus.

Referring next to FIG. 1A, an alternative illustrative embodiment of a composite induction consolidation apparatus is generally indicated by reference numeral 1a. The apparatus 1a may include a base mandrel 9 having a base mandrel facesheet 21 on the contoured mandrel surface 10 thereof. Solenoidal magnetic induction coils 14 may extend through the base mandrel 9. Application of the apparatus 1a may be as was heretofore described with respect to the apparatus 1 in FIG. 1 except ambient pressure 28 applies the thermoplastic composite part 24 against the base mandrel facesheet 21 during the consolidation process.

Figure 1B:
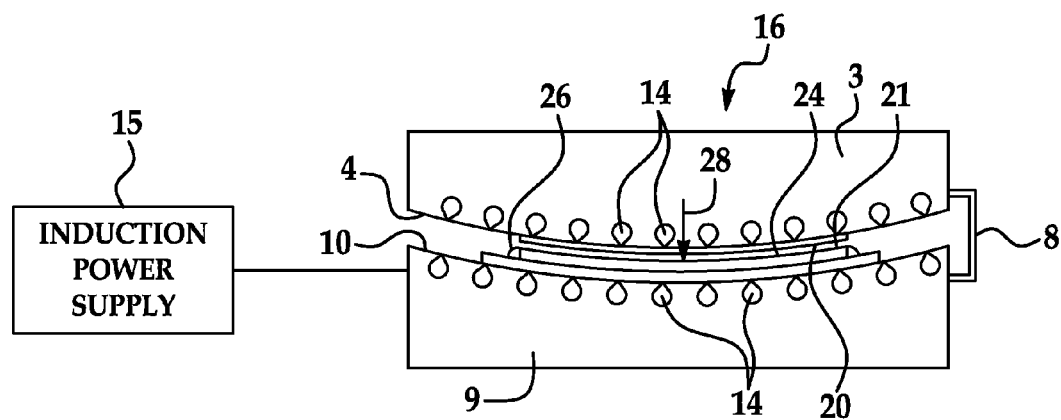
FIG. 1B is a block diagram of another alternative illustrative embodiment of the composite induction consolidation apparatus.

Referring next to FIG. 1B, another alternative illustrative embodiment of a composite induction consolidation process is generally indicated by reference numeral 1b. The apparatus 1b may include a base mandrel 9 having a base mandrel facesheet 21 on the contoured mandrel surface 10 thereof. An enclosing hood 3 having a contoured hood surface 4 with a solenoidal magnetic induction coils 14 may be pivotally attached to the base mandrel 9 via a hinge 8. Application of the apparatus 1b may be as was heretofore described with respect to the apparatus 1a in FIG. 1A, with ambient pressure 28 applying the thermoplastic composite part 24 against the base mandrel facesheet 21 during the consolidation process. The magnetic induction coils 14 of the enclosing hood 3 may generate additional heat to heat the thermoplastic composite part 24 during consolidation.

Figure 4:
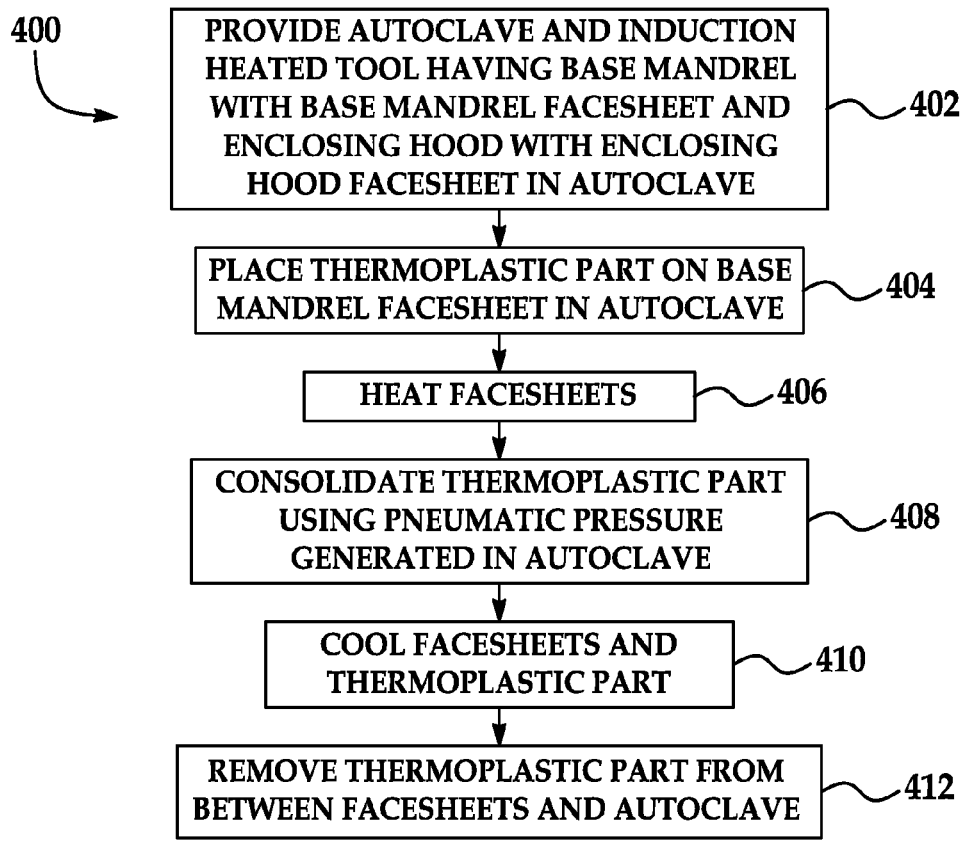
FIG. 4 is a flow diagram of an illustrative embodiment of a composite induction consolidation method.

Referring next to FIG. 4, a flow diagram 400 of an illustrative embodiment of a composite induction consolidation method is shown. The composite induction consolidation method 400 may be implemented in operation of the apparatus 1 in FIG. 1. In block 402, an autoclave with an induction heated tool having a base mandrel with a base mandrel facesheet and an enclosing hood with an enclosing hood facesheet in the autoclave is provided. In block 404, a thermoplastic composite part may be placed on the base mandrel facesheet of the base mandrel. A bagging material may be placed on the thermoplastic composite part and the part evacuated onto the base mandrel facesheet. In block 406, the facesheets may be heated to the Curie temperature point. In some applications, the facesheets may be heated to a temperature of at least about 705 degrees F. by magnetic induction. In block 408, the thermoplastic composite part may be consolidated using pneumatic pressure generated in the autoclave. In some applications, the pneumatic pressure which is applied to the part may be at least about 200 psi. In block 410, the facesheets and the thermoplastic composite part may be cooled. In some embodiments, the facesheets and the thermoplastic composite part may be cooled using gas cooling. In block 412, the thermoplastic composite part may be removed from between the facesheets and from the autoclave.

Figure 4A:
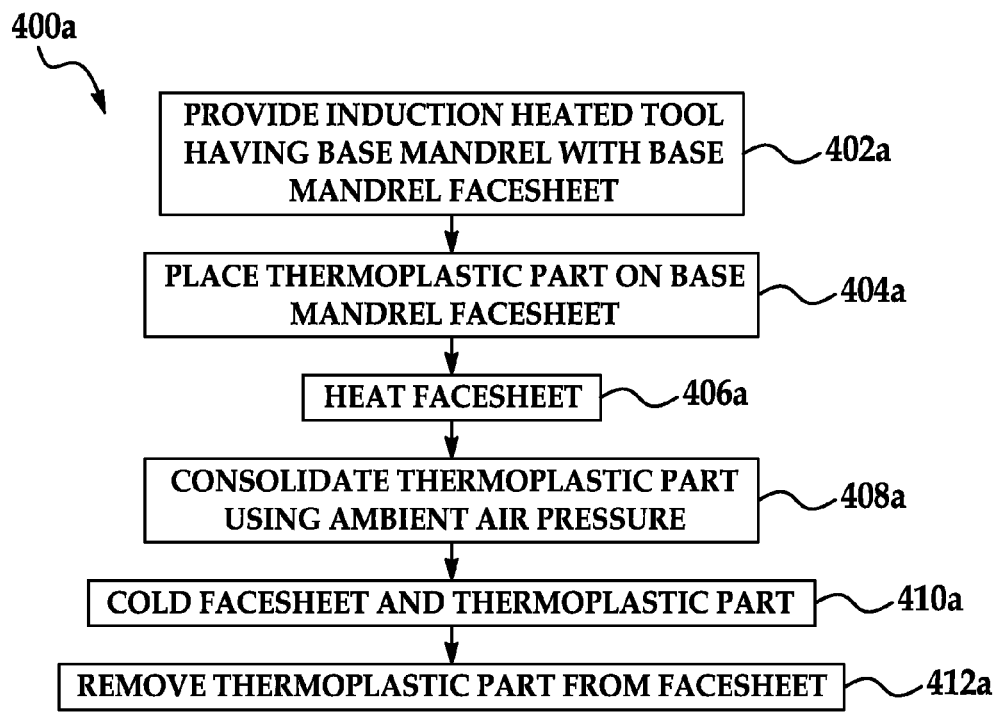
FIG. 4A is a flow diagram of an alternative illustrative embodiment of a composite induction consolidation method.

Referring next to FIG. 4A, a flow diagram 400a of an alternative illustrative embodiment of a composite induction consolidation method is shown. The composite induction consolidation method 400a may be implemented in operation of the apparatus 1a in FIG. 1A. In block 402a, an induction heated tool having a base mandrel with a base mandrel facesheet is provided. In block 404a, a thermoplastic part may be placed on the base mandrel facesheet. In block 406a, the base mandrel facesheet may be heated by magnetic induction. In block 408a, the thermoplastic part may be consolidated using ambient air pressure. In block 410a, the base mandrel facesheet and the thermoplastic part may be cooled. In block 412a, the thermoplastic part may be removed from the base mandrel facesheet.

Figure 4B:
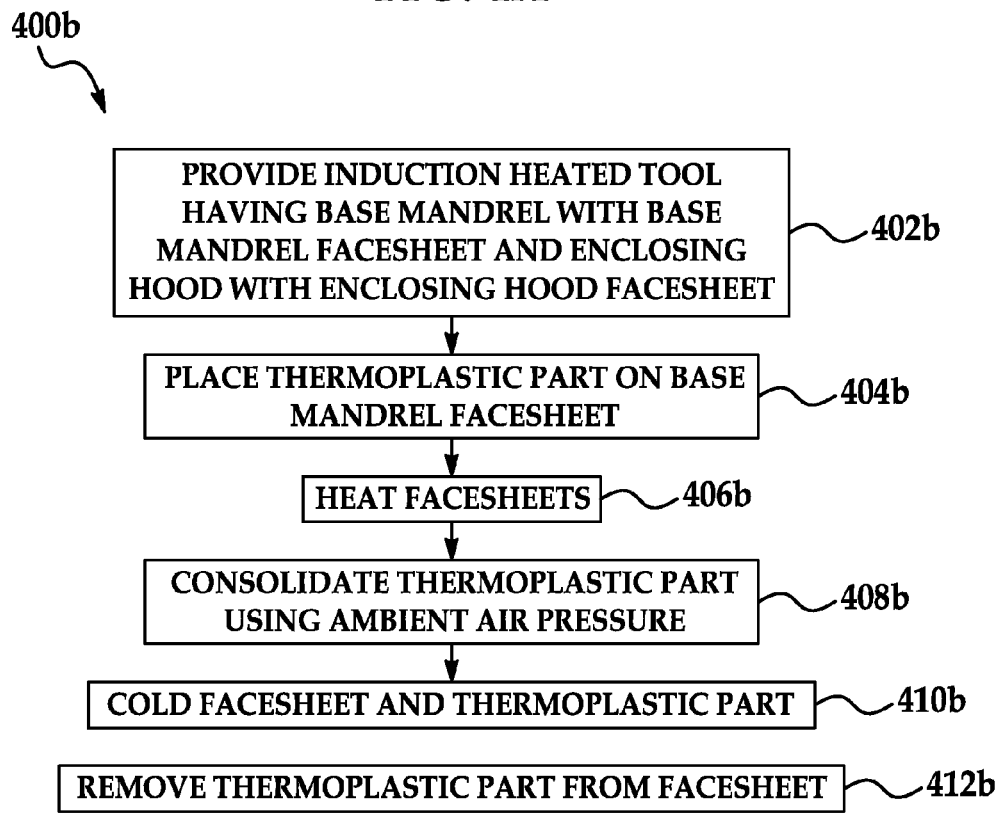
FIG. 4B is a flow diagram of another alternative illustrative embodiment of a composite induction consolidation method.

Referring next to FIG. 4B, a flow diagram 400b of another alternative illustrative embodiment of a composite induction consolidation method is shown. The composite induction consolidation method 400b may be implemented in operation of the apparatus 1b in FIG. 1B. In block 402b, an induction heated tool having a base mandrel with a base mandrel facesheet and an enclosing hood with an enclosing hood facesheet is provided. In block 404b, a thermoplastic part may be placed on the base mandrel facesheet. In block 406b, the facesheets may be heated by magnetic induction. In block 408b, the thermoplastic part may be consolidated using ambient air pressure. In block 410b, the facesheets and the thermoplastic part may be cooled. In block 412b, the thermoplastic part may be removed from between the facesheets.

Figure 5:
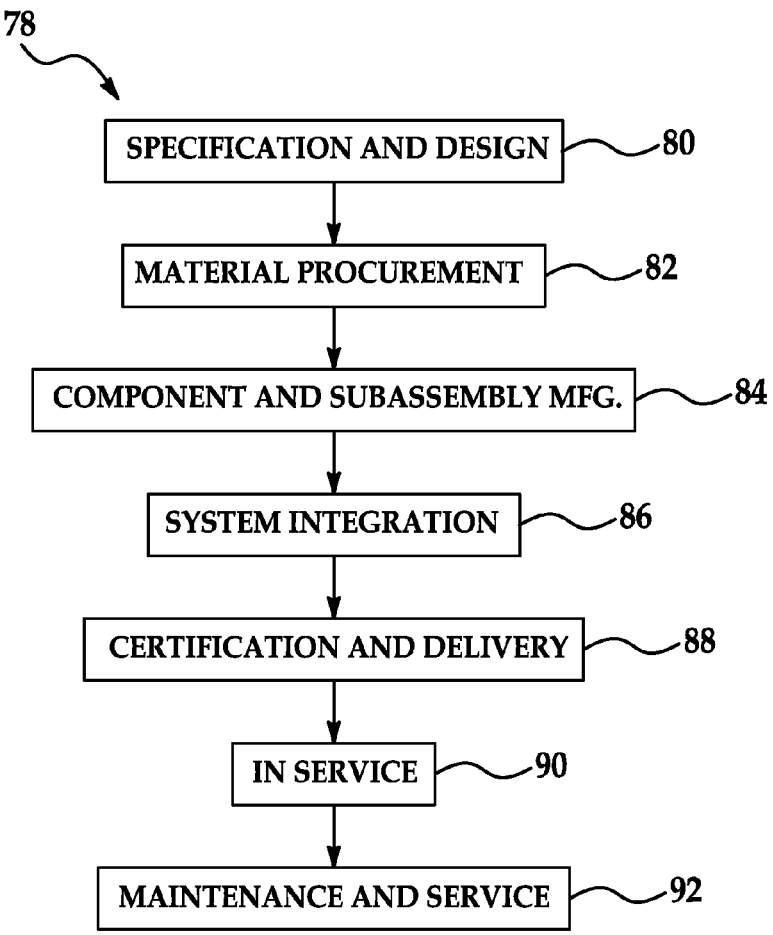
FIG. 5 is a flow diagram of an aircraft production and service methodology.
Figure 6:
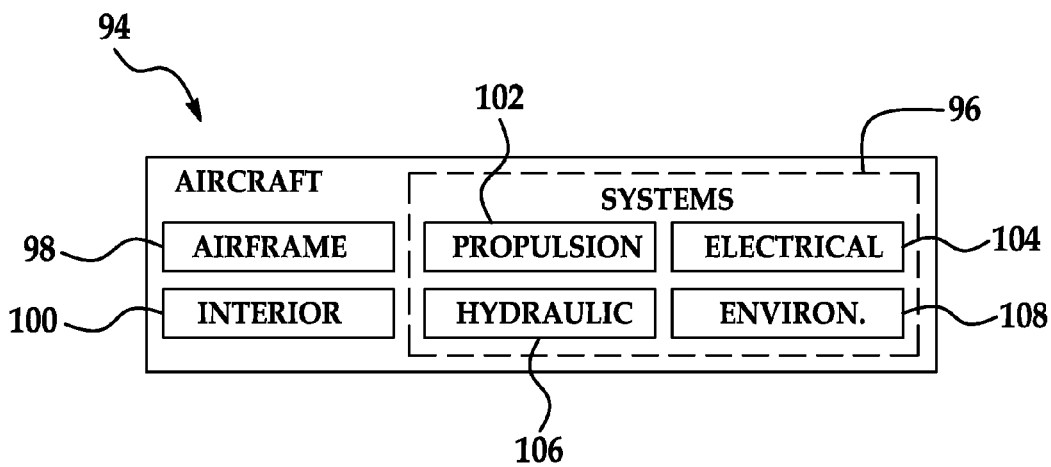
FIG. 6 is a block diagram of an aircraft.

Referring next to FIGS. 5 and 6, embodiments of the disclosure may be used in the context of an aircraft manufacturing and service method 78 as shown in FIG. 5 and an aircraft 94 as shown in FIG. 6. During pre-production, exemplary method 78 may include specification and design 80 of the aircraft 94 and material procurement 82. During production, component and subassembly manufacturing 84 and system integration 86 of the aircraft 94 takes place. Thereafter, the aircraft 94 may go through certification and delivery 88 in order to be placed in service 90. While in service by a customer, the aircraft 94 may be scheduled for routine maintenance and service 92 (which may also include modification, reconfiguration, refurbishment, and so on).

Each of the processes of method 78 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 6, the aircraft 94 produced by exemplary method 78 may include an airframe 98 with a plurality of systems 96 and an interior 100. Examples of high-level systems 96 include one or more of a propulsion system 102, an electrical system 104, a hydraulic system 106, and an environmental system 108. Any number of other systems may be included. Although an aerospace example is shown, the principles of the invention may be applied to other industries, such as the automotive industry.

The apparatus embodied herein may be employed during any one or more of the stages of the production and service method 78. For example, components or subassemblies corresponding to production process 84 may be fabricated or manufactured in a manner similar to components or subassemblies produced while the aircraft 94 is in service. Also one or more apparatus embodiments may be utilized during the production stages 84 and 86, for example, by substantially expediting assembly of or reducing the cost of an aircraft 94. Similarly, one or more apparatus embodiments may be utilized while the aircraft 94 is in service, for example and without limitation, to maintenance and service 92.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A composite induction consolidation apparatus for heating and consolidating a composite part, comprising:
    a base mandrel;
    a ferromagnetic base mandrel facesheet having a specific Curie temperature carried by said base mandrel;
    said base mandrel facesheet is adapted to support the composite part and allow ambient air pressure to compact the composite part against said base mandrel facesheet;
    at least one magnetic induction coil in said base mandrel;
    an enclosing hood connected to said base mandrel;
    a bagging positioned between said base mandrel and said enclosing hood, the composite part positioned in the bagging, the bagging evacuated such that the composite part is consolidated onto the base mandrel with ambient air pressure; and
    an autoclave, said base mandrel and said enclosing hood contained in said autoclave.

2. The apparatus of claim 1 wherein said at least one magnetic induction coil comprises at least one solenoidal magnetic induction coil.

3. The apparatus of claim 1 further comprising a ferromagnetic enclosing hood facesheet having a specific Curie temperature carried by said enclosing hood and adapted for positioning into adjacent proximity to the composite part.

4. The apparatus of claim 3 further comprising at least one magnetic induction coil in said enclosing hood.

5. The apparatus of claim 4 wherein said at least one magnetic induction coil comprises at least one solenoidal magnetic induction coil.

6. The apparatus of claim 5 wherein said base mandrel and said enclosing hood are contained in said autoclave, the at least one magnetic induction coil in said base mandrel and the at least one magnetic induction coil in said enclosing hood configured to raise the composite part to a steady temperature and the autoclave configured to consolidate the composite part at the steady temperature.

7. The apparatus of claim 1 further comprising at least one cooling channel extending through said base mandrel.

8. The apparatus of claim 1, wherein the autoclave is configured to provide a pressure of at least 200 psi.

9. The apparatus of claim 1, wherein the at least one magnetic induction coil is configured to operate at a frequency of approximately 2 KHz.

10. The apparatus of claim 1, wherein the base mandrel and the enclosing hood comprise a laminated tooling.

11. A composite induction consolidation apparatus for heating and consolidating a composite part, comprising:
   a base mandrel;
   a ferromagnetic base mandrel facesheet having a specific Curie temperature carried by said base mandrel;
   said base mandrel facesheet is adapted to support the composite part and allow ambient air pressure to compact the composite part against said base mandrel facesheet;
   at least one magnetic induction coil in said base mandrel;
   at least one cooling channel extending through said base mandrel;
   an enclosing hood carried by said base mandrel;
   a bagging positioned between said base mandrel and said enclosing hood, the composite part positioned in the bagging, and the bagging configured to be evacuated so as to consolidate the composite part against said base mandrel with ambient air pressure;
   a ferromagnetic enclosing hood facesheet having a specific Curie temperature carried by said enclosing hood and adapted for positioning into adjacent proximity to the composite part;
   at least one magnetic induction coil in said enclosing hood;
   at least one cooling channel extending through said enclosing hood;
   an autoclave, said base mandrel and said enclosing hood contained in said autoclave, the at least one magnetic induction coil in said base mandrel and the at least one magnetic induction coil in said enclosing hood configured to raise the composite part to a steady temperature and the autoclave configured to consolidate the composite part at the steady temperature.

12. The apparatus of claim 11 wherein said at least one magnetic induction coil in said base mandrel comprises at least one solenoidal magnetic induction coil in said base mandrel.

13. The apparatus of claim 11 wherein said at least one magnetic induction coil in said enclosing hood comprises at least one solenoidal magnetic induction coil in said enclosing hood.

14. The apparatus of claim 11 wherein each of said mandrel facesheet and said enclosing hood facesheet comprises a 64FeNi smart susceptor.

15. The apparatus of claim 11, wherein the autoclave is configured to provide a pressure of at least 200 psi.

16. The apparatus of claim 11, wherein the at least one magnetic induction coil in said base mandrel and the at least one magnetic coil in said enclosing hood are configured to operate at a frequency of approximately 2 KHz.

17. The apparatus of claim 11, wherein the at least one magnetic induction coil in said base mandrel and the at least one magnetic coil in said enclosing hood are configured to perform an induction heating of the composite part and the autoclave is configured to perform a consolidation of the composite part at cycle time of approximately 50 minutes or less.

18. The apparatus of claim 11, wherein the base mandrel and the enclosing hood comprise a laminated tooling.

* * * * *